(12) United States Patent
Reguillon et al.

(10) Patent No.: US 12,297,568 B2
(45) Date of Patent: May 13, 2025

(54) FABRIC INTEGRATING AT LEAST ONE BINDING PART

(71) Applicant: CHAMATEX, Ardoix (FR)

(72) Inventors: Gilles Reguillon, Saint Maurice l'exil (FR); Sylvain Bossis, Chanas (FR); Matéo Castro, Lyons (FR); Grégoire Laverty, Lyons (FR); Bertrand Barre, Lapeyrouse (FR)

(73) Assignee: CHAMATEX, Ardoix (FR)

( * ) Notice: Subject to any disclaimer, the term of this patent is extended or adjusted under 35 U.S.C. 154(b) by 409 days.

(21) Appl. No.: 16/605,281

(22) PCT Filed: Apr. 12, 2018

(86) PCT No.: PCT/FR2018/050932
§ 371 (c)(1),
(2) Date: Oct. 15, 2019

(87) PCT Pub. No.: WO2018/189494
PCT Pub. Date: Oct. 18, 2018

(65) Prior Publication Data
US 2021/0137206 A1 May 13, 2021

(30) Foreign Application Priority Data
Apr. 12, 2017 (FR) ...................................... 1753196

(51) Int. Cl.
*D03D 11/02* (2006.01)
*A43B 5/10* (2006.01)
(Continued)

(52) U.S. Cl.
CPC ............ *D03D 11/02* (2013.01); *A43B 23/042* (2013.01); *A43C 1/04* (2013.01); *B32B 5/263* (2021.05);
(Continued)

(58) Field of Classification Search
CPC .... A43C 1/04; A43C 1/00; A43C 5/00; A43C 11/00; A43B 23/024; A43B 23/0235;
(Continued)

(56) References Cited

U.S. PATENT DOCUMENTS 236,059 A 12/1880 Mills
5,080,142 A * 1/1992 Calamito ............... D03D 11/02
139/411

(Continued)

FOREIGN PATENT DOCUMENTS

| CA | 2 183 748 A1 | 8/1995 | |
|---|---|---|---|
| DE | 1277765 B * | 9/1968 | ............. D03D 11/02 |
| DE | 44 03 272 A1 | 8/1995 | |

OTHER PUBLICATIONS

Translation of DE-1277765-B (Year: 1968).*
Jun. 11, 2018 Search Report issued in International Patent Application No. PCT/FR2018/050932.

*Primary Examiner* — Sharon M Prange
*Assistant Examiner* — Grady Alexander Nunnery
(74) *Attorney, Agent, or Firm* — Oliff PLC

(57) ABSTRACT

A fabric integrating one or more binding parts with a tie obtained by the following textile construction of the fabric: a) the fabric includes two superposed individual layers of fabric secured to one another, one outer layer on the tie side and the other inner layer lining the inner layer of fabric, b) several warp threads of the outer layer of fabric, called binding threads as they together form a binding loop, freely overlapping several weft threads of the same layer and/or several weft threads of the outer layer of fabric, called binding threads as they together form a binding loop, freely overlapping several warp threads of the same layer, with the inner layer of fabric, an eyelet for passage of the tie at the place where the weft and/or warp threads overlap, obtained (Continued)

Figure 1:
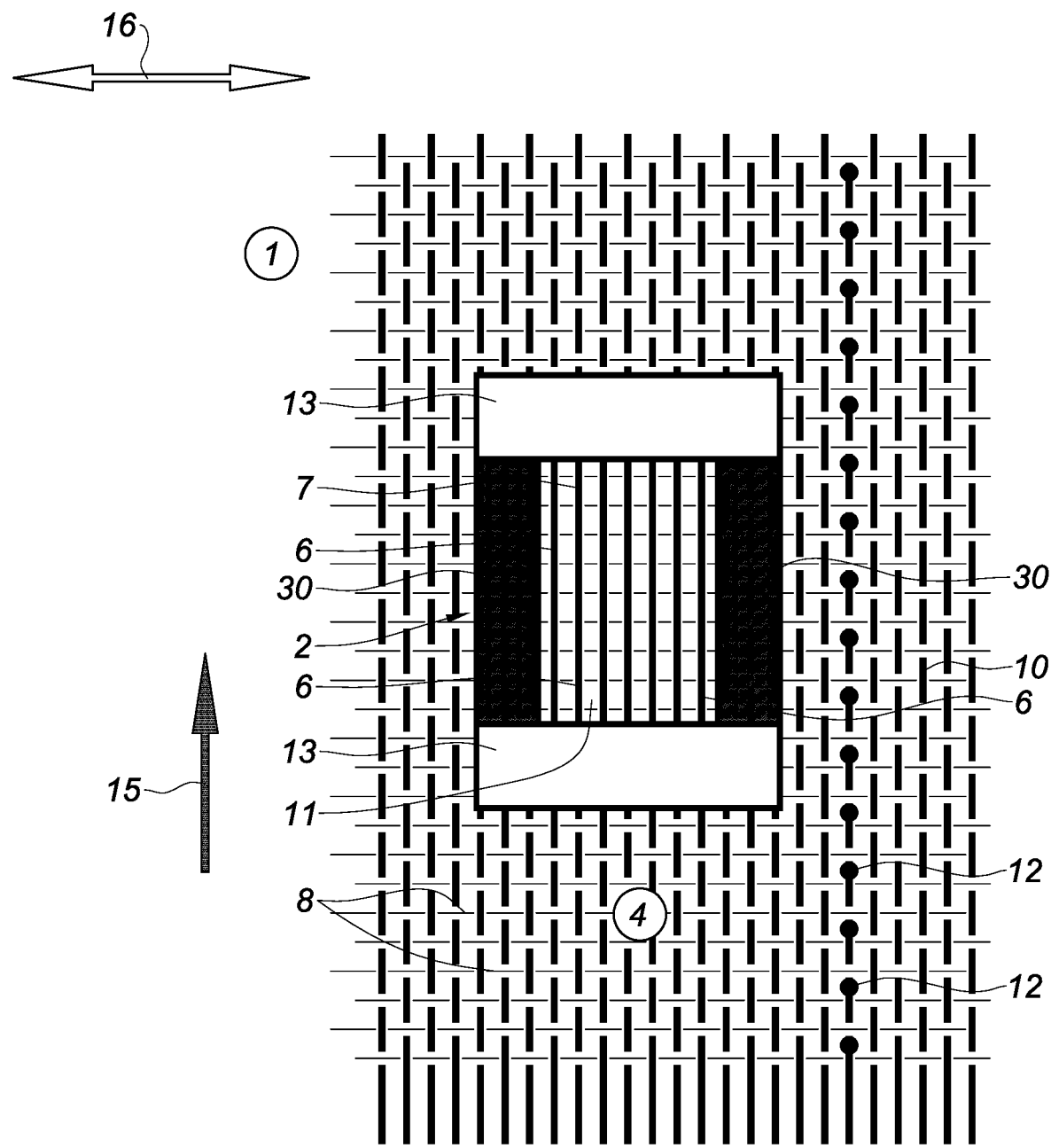

by deformation and/or extension of said binding threads, at the binding location of the fabric.

12 Claims, 8 Drawing Sheets

(51) Int. Cl.
    *A43B 23/02*     (2006.01)
    *A43B 23/04*     (2006.01)
    *A43C 1/04*     (2006.01)
    *B32B 5/26*     (2006.01)

(52) U.S. Cl.
    CPC ............. *A43B 5/10* (2013.01); *A43B 23/0265* (2013.01); *B32B 2437/02* (2013.01); *D10B 2403/0113* (2013.01); *D10B 2501/043* (2013.01)

(58) Field of Classification Search
    CPC ...... A43B 1/04; A43B 1/02; D10B 2501/043; D03D 11/02
    See application file for complete search history.

(56) References Cited

U.S. PATENT DOCUMENTS

| | | | | |
|---|---|---|---|---|
| 5,659,930 | A * | 8/1997 | Okawa | A44B 18/0023 428/218 |
| 5,996,189 | A * | 12/1999 | Wang | A44C 5/0053 24/445 |
| 6,443,187 | B1 * | 9/2002 | Wang | A44B 18/0023 24/445 |
| 8,959,959 | B1 | 2/2015 | Podhajny | |
| 2006/0154546 | A1 * | 7/2006 | Murphy | A61F 13/023 428/317.1 |
| 2012/0233883 | A1 * | 9/2012 | Spencer | B29B 17/04 264/37.3 |
| 2013/0270389 | A1 * | 10/2013 | Godon | B29C 70/222 244/54 |
| 2014/0173932 | A1 | 6/2014 | Bell | |
| 2014/0237861 | A1 * | 8/2014 | Podhajny | D04B 15/56 66/170 |
| 2014/0310855 | A1 * | 10/2014 | Clifton, Jr. | F41C 33/046 2/338 |
| 2016/0326673 | A1 | 11/2016 | Reguillon et al. | |

\* cited by examiner

FABRIC INTEGRATING AT LEAST ONE BINDING PART

The present invention relates to the fabrics sector, in particular that of fabrics, either technical or not, implemented, manufactured or worked to obtain different finished products, objects or articles for domestic, industrial or professional use.

The present invention will be presented and explained in detail by reference to the technical sector of footwear, or shoes, without it having to be considered that this invention has to be limited to this sector, as far as its applications in particular are concerned.

Conventionally, all footwear comprises:
- a sole,
- an upper, traditionally formed by a plurality of parts cut from different materials (textile, plastic material in film or sheet form, leather, etc.) assembled to one another by different means such as stitching, sticking, etc.,
- a means for closing the inner volume of the upper, comprising in general manner on the one hand two series of binding or lacing parts on each side of an indent of the upper, filled or not by a tongue, and on the other hand a tie, or lace, linking or passing through said binding parts, straddling this indent.

In practice, specifically as regards the means for closing, different solutions are currently implemented, among which in the order of increasing complexity:
a) when the two edges of the indent are made from leather or from injected plastic material, the latter are perforated to allow the lace to pass;
b) when the upper is obtained from a light and technical, synthetic material such as a technical fabric, metal or plastic eyelets are added, on each side of the indent of the upper, to allow the lace to pass; or each edge of the indent is reinforced by thermowelding of a flexible technical plastic material, for example a TPU, and each edge reinforced in this way is then perforated to allow the lace to pass;
c) two series of hooks or mini-straps each including or not an eyelet through which a lace passes, or two series of any other lace attachment means, are added by any suitable means such as stitching, soldering, riveting, etc., on each side of the indent of the upper.

All these solutions have in common the drawback of requiring one or more additional operations, that are often manual, to obtain the required means for closing the footwear. They also require additional components or materials which in any case make the shoe heavier and which may not be acceptable in the case of a performance sport shoe, for example in the case of a shoe for a racket sport such as tennis. And overall, these solutions in one way or another have the result of increasing the cost price of the pair of shoes.

The object of the present invention is to remedy the above-mentioned shortcomings, highlighted in the case of footwear but which are prevailing or of similar nature when it is required to tie, attach or link any fabric or textile part, by means of a tie, with an object or another part.

In accordance with Patent DE 1,277,765, a textile belt strip for trousers or a dress is described and shows, with reference to the exemplary embodiment according to FIGS. 1 to 4, a fabric comprising two individual layers, one outer or top layer (2) of satin weave and the other inner or bottom layer (1) lining the outer layer of fabric. As shown more particularly by FIG. 4 completed by FIG. 3, several binding parts or loops (8) with a tie or belt (not shown) are integrated in the fabric of the textile belt strip (cf. col. 4, lines 3-5); these binding parts (8) are distributed or offset with respect to one another in the weft direction of the outer layer (2), it being observed that, according to FIG. 4 and cf. col. 3, lines 43 and 48, threads (3) and (5) represented in cross-section are warp threads. Each binding part (8) is obtained, at the place where binding of the tie (not shown) with the fabric is performed, by free overlap of several warp threads (5) of the outer layer (2) by two thick weft threads (4) that are binding threads as they together form a binding loop (13/14), one represented schematically in FIG. 4 by a dotted line and the other by a mixed line, these two weft and binding threads belonging to the inner layer (1) of the fabric of the textile strip; cf. col. 3, lines 60-2, col. 4, lines 5-24.

Figure 3:
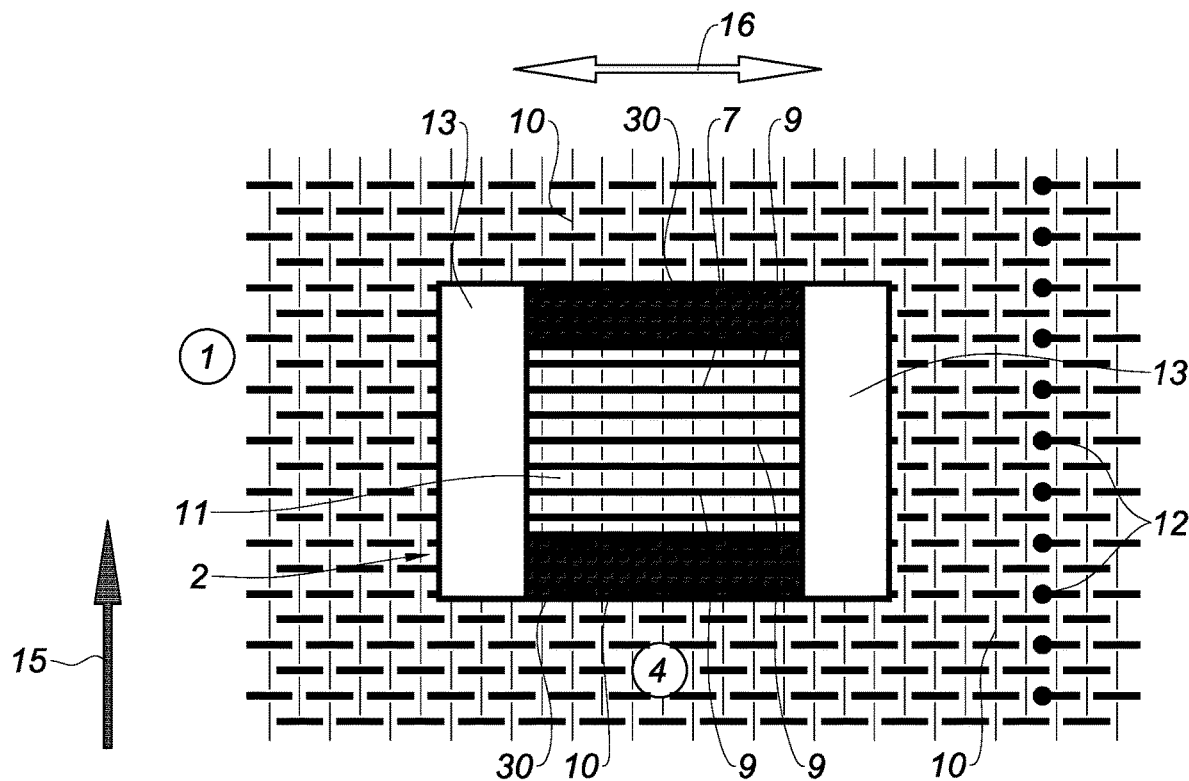
Figure 4:
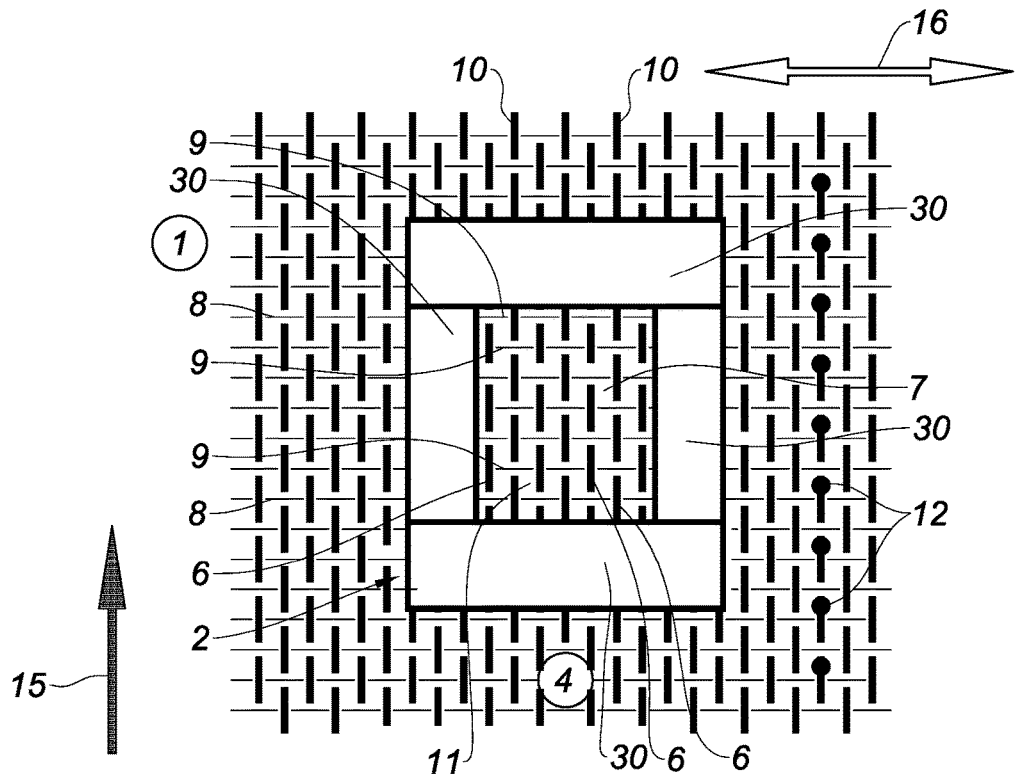

In accordance with DE 1,277,765, each of the thick weft and binding threads (4) belonging to inner layer (1) of the fabric presents, when woven, a free section or length, between its joining points 14 and 17 with the rest of the fabric, in the sense that, as shown and made explicit by FIGS. 3 and 4, this section with a length equal to the developed length of the binding loop (13/14) is not fixed or attached to the rest of the fabric, for example by interweaving (when weaving is performed) with warp threads (5) of outer layer (2). Consequently, this free section of each of the weft and binding threads (4) overlaps a certain number (seven according to FIG. 4) of warp threads (5) of outer layer (2), in the sense of being astride perpendicular to and above the latter, in the manner of a bridge arch.

In accordance with DE 1,277,765, the length of the free section of each of binding threads (4) between joining points (14) and (17) with the rest of the fabric is equal to the developed length of the binding loop (13/14), i.e. perpendicularly to its narrow width. As shown in particular by FIG. 3, this length is therefore much greater than the distance separating warp threads (5) of outer layer (2) joined on each side of binding loop (13/14), i.e. between joining points (14) and (17). Consequently, according to DE 1,277,765, running in binding loop (13/14) is determined and obtained solely by the slack link formed in the latter, due to the large length of the free section of binding threads (4) at the place where they overlap warp threads (5) of the upper layer of fabric.

A solution for binding a fabric with an added-on tie, described/defined by DE 1,277,765, is quite suitable in the clothing field when it is required to attach a belt for example to a pair of trousers or a dress worn by a user. In such a case, for example when the user tightens his/her belt, there is practically no mechanical stress exerted on the fabric of the textile strip in the outwards direction, i.e. in a direction orthogonal to the extension direction of fabric or strip, for example "centrifugal", i.e. towards the outside of the fabric, in the direction going from the inner layer to the outer layer of the fabric.

Such a solution may not be suitable when the add-on tie exerts large and/or repeated stresses on the fabric towards the outside of the latter via the binding parts, for example by traction. In such a case, the fabric is liable to break, tear or destructure on account of the low strength of the inner layer of the fabric, in place of or in line with the binding parts constructed and obtained in the outer layer, by "raising" the binding threads, held in the inner layer, into the outer layer. The branches of each binding part are moreover liable to encourage "initiation" of destructuring of the fabric in the case of a large and/or repeated "centrifugal" stress, i.e. towards the outside of the fabric, via the tie.

The object of the present invention is to remedy the shortcomings of binding solutions integrated in a fabric, with the aim of achieving an enhanced mechanical strength of the latter, in case of large repeated stresses exerted by the tie towards the outside of the fabric.

It is thereby a further object of the present invention to provide a fabric integrating binding parts able to be used in new contexts that are particularly demanding as far as the global or local strength of the fabric is concerned.

A fabric according to the present invention is characterised by the fact that:
 a) the binding threads of each binding part belong to the outer layer of fabric and predefine, with the inner layer of fabric, an eyelet for passage of the tie, at the point or place where free overlap of the weft threads or warp threads by said binding warp or weft threads takes place;
 b) this eyelet for passage of the tie is obtained by deformation and/or extension of the binding threads at the place where binding to the fabric takes place.

What is meant by "free overlap" of the warp or weft threads by the binding weft or warp thread(s), depending on the case, as already shown by the document DE 1,277,765, is that, at the location of the overlap, each binding thread comprises a free section or length in the sense that the latter is not fixed or attached to the rest of the fabric, for example by interweaving (when weaved) with the warp or weft threads of the outer layer of the fabric or more generally of the latter, depending on the case, as shown and explained in detail hereafter with reference to FIGS. 1, 2, 3 and 4 appended to the present description.

As explained in detail in the following with reference to FIGS. 1 to 4 appended to the present description, the eyelet obtained by deformation and/or extension of the binding threads implies that the free section of each previously considered binding thread has a length practically equal to the distance separating the first overlapped warp thread from the last overlapped warp thread, or the first overlapped weft thread from the last overlapped weft thread in the binding direction, depending on the case; by means whereof, to obtain a binding loop, it is necessary to either deform or extend the binding thread, provided that the latter has a sufficient elasticity, to obtain an eyelet presenting a cross-section strictly matching that of the tie.

Figure 2:
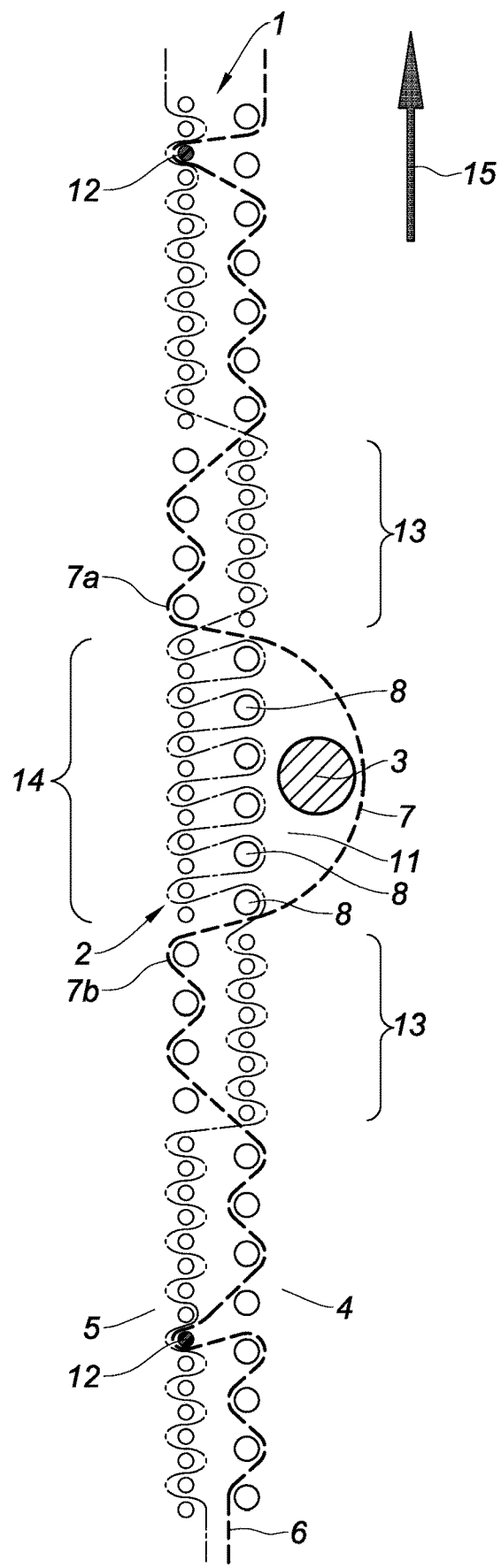

As is better shown by FIG. 2, in the case of warp binding threads (6), forming binding loop (7), the latter comprises two feet (7a) and (7b) separated by a plurality of weft threads (8) of outer layer (4). With reference to FIG. 3, in the case of weft binding threads (9) forming binding loop (7), the two feet (7a) and (7b) are separated by a plurality of warp threads (10) of outer layer (4).

By means of the invention, each loop for passage of the tie is better or more completely integrated in the construction of the fabric, and the pull-out resistance of the latter perpendicularly to the binding line or to the tie, due for example to a traction on the latter, is substantially improved.

A fabric according to the present invention can thereby be used in different applications that are particularly demanding as far as the permanence of the initial or primary textile construction of the fabric is concerned, in the event of large or repeated stresses on the tie.

Among these applications, a fabric according to the invention can be used for manufacture/production of footwear, in particular sport shoes, in particular for pursuit of a racket sport, and comprising a flexible part of small thickness, such as an upper. In such a case, a fabric according to the invention makes it possible to obtain the means for closing the inner volume of the upper directly, i.e. without the addition of complementary parts or components and/or without any additional operation or reworking, the means for closing comprising two series of lacing parts, on each side of an indent of this same upper, and a lace linking or passing through these lacing parts, straddling the indent in the fabric itself, the binding part(s) with the tie, required for the function(s) of the same fabric, or of any component or article worked or manufactured with said fabric, such as the means for closing an item of footwear referred to and discussed in the foregoing.

The warp and/or weft threads of the outer layer of the fabric chosen to form the binding loop are contiguous or adjacent to one another or not.

In a particular form of the binding part, at the binding location, for example at the binding point of the fabric, on the one hand several binding warp threads of the outer layer of fabric freely overlap several weft threads of the same layer, and on the other hand several binding weft threads freely overlap several warp threads of the same layer; but the binding warp threads and binding weft threads are themselves interwoven at the surface of or underneath the outer layer to together preform a woven binding loop.

As far as the binding part proper is concerned, its textile construction is preferentially strengthened in different manners able to be implemented separately or in combination so as to provide a better resistance to the large and/or repeated stresses resulting from the tension applied on the tie, for example by pulling on a lace to close a shoe.

According to a first exemplary embodiment of the invention, the outer layer of fabric is locally strengthened under the binding loop, by raising several warp and/or weft threads of the inner layer of fabric onto the outer layer and interweaving, for example with a predefined weave, with weft and/or warp threads of the outer layer left free under the binding loop, as they are freely overlapped respectively by the binding warp and/or weft threads.

According to a second exemplary embodiment of the invention, the outer layer of fabric is locally reinforced in one and/or the other overlap direction to obtain the binding loop, i.e. in the warp direction and/or the weft direction, on one side of the eyelet or the other, by raising several warp and/or weft threads of the inner layer of fabric onto the outer layer and interweaving, for example with a predefined weave.

According to a third exemplary embodiment of the invention, the outer layer of fabric is locally reinforced in at least one reinforcement direction perpendicular to one and/or the other overlap direction to obtain the binding loop, i.e. perpendicular to the warp direction and/or the weft direction, on the side where at least one foot of the loop is located, by raising several warp and/or weft threads of the inner layer of fabric onto the outer layer and interweaving, for example with a predefined weave.

According to the invention, in the rest of the fabric, i.e. outside the binding part or parts, the outer and inner layers of the fabric are attached on one another, with any predefined securing weave.

Different securing methods of the outer and inner layers of the fabric are used, for example:
 by back warp,
 by forward warp,
 by back warp and forward warp,
 preferentially, by additional warp or additional weft.

Preferentially, several or multiple binding parts are integrated in the fabric, being distributed in the latter in the warp direction and/or the weft direction of the outer layer of the fabric. For example, in order to distribute the stresses on the surface of the fabric resulting from the tension applied on the tie, for example by pulling on a lace to close a footwear, the binding parts are offset from one another in the warp direction and/or the weft direction of the outer layer of fabric.

According to the present invention, a plurality or multiplicity of binding parts are integrated in the fabric, being distributed on or at the surface of the outer layer of fabric, with any binding line or path chosen or determined according to the application or use intended for the fabric. It is thus possible to make one and the same tie pass respectively through different eyelets of the binding parts, the tie then being attached or secured on the fabric along the line or path fixed by the arrangement/distribution of the binding parts in the surface of the fabric. In this way, if a means for closing an item of footwear as defined in the foregoing is to be achieved, the binding parts should be arranged and distributed along two straight and/or curved binding lines, symmetrical or arranged symmetrically with respect to any one direction so that, after cutting and shaping of the fabric to obtain the footwear upper, two series of binding parts will be directly obtained facing one another on each side of the indent present on the upper.

In industrial practice of the invention, a fabric as defined in the above is obtained by implementation, or a weaving operation on any suitable double-warp weaving loom. A Jacquard loom may be preferred on account of the infinite variety of the number and/or positioning of the binding parts able to be obtained with the latter.

On completion of a weaving operation with such a loom, a web or fabric part according to the invention is obtained in which a multiplicity of templates are preferentially distributed and/or arranged in the warp and/or weft direction, each of these templates serving the purpose of obtaining a single same component or article and comprising for this purpose one or more binding lines as defined previously along which the binding parts are distributed. For example to obtain the means for closing a footwear item, i.e. a shoe, the template in which the upper of the latter will be cut will comprise two binding lines symmetrical with respect to a direction parallel to the warp or the weft of the fabric in order to directly obtain two series of facing binding or lacing parts after cutting and shaping of the upper.

The present invention relates to any article or product, in particular footwear, for example for pursuit of a sport, in particular a racket sport (tennis for example), obtained by implementation of a fabric according to the invention.

Consequently, the general feature of such an article or product is to comprise a flexible part of small thickness, such as a footwear upper, at least partially formed by or constituted by a fabric according to the invention.

The applications of a fabric according to the present invention are multifarious. By means of the latter, it is possible to obtain any article or product comprising or integrating at least one function of binding on itself or with another object or support.

In non-exhaustive or limitative manner, among these applications, footwear or shoes, already named, in particular sport shoes or safety shoes, can be cited along with luggage articles such as bags, individual protective equipment, tarpaulins, and items of clothing.

The present invention relates in particular to footwear, for example a sport shoe, such as a shoe for pursuit of a racket sport (tennis for example), this footwear comprising:
  a sole,
  an upper the bottom peripheral edge of which is joined to the sole,
  a means for closing the inner volume of the upper comprising on the one hand a component made from fabric according to the invention, able to be the upper itself, worked or arranged to provide two series of binding parts opposite one another on each side of an indent, and on the other hand a tie joining the different binding parts and straddling said indent.

The term "article" or "product" refers to an object, for example a manufactured or finished object that is ready for use or designed for a given usage, such as a footwear item, for example a sport shoe.

The term "fabric" refers in general manner to a textile or a cloth obtained on a weaving loom, and in particular to a half-product, semi-product or pre-product that itself has to be worked, crafted or wrought to obtain a component, such as a flexible part, or directly a finished article or product.

What is meant by "thread" is, as understood in the textile industry, any one-dimensional strand having a length larger than its width and/or thickness, comprising filaments, spun yarns, fibres, continuous or discontinuous threads, cables or other, formed from/by different traditional materials or techniques, i.e. presenting functional or improved properties/characteristics.

In particular as far as the warp threads and/or weft threads of the fabric according to the invention are concerned, in particular those assigned to binding, the latter will preferentially be technical threads comprising for example at least one mechanically strong material, for example a high tenacity polyamide (PA HT), and/or a para-aramid, or a carbon. Such technical threads can be coated or sheathed, for example with a polyurethane, which may if required be charged with ceramic.

The warp threads and/or weft threads, and in particular the binding threads, individually have a simple construction, for example with a mono-filament, or a complex construction, for example by assembly by twisting of several individual threads or by wrapping of one or more threads around a wire core.

The term "flexible part" refers to any part obtained by cutting by any suitable means (for example a punch cutter or laser cutting), the location of which is marked or registered with respect to the fabric, in particular on a template of a width of fabric according to the invention.

The term "tie" refers to an elongate flexible element serving the purpose of tying or attaching, whatever its shape. The terms "lace", "string", "cable", "cord" refer to ties considered by the present invention.

The term "binding" refers to any action by means of a tie to attach, link, join, secure an object, product or article with or onto itself or with another object or support. In the meaning according to the invention, the binding is formed by a lacing, a strapping, etc.

Figure 5:
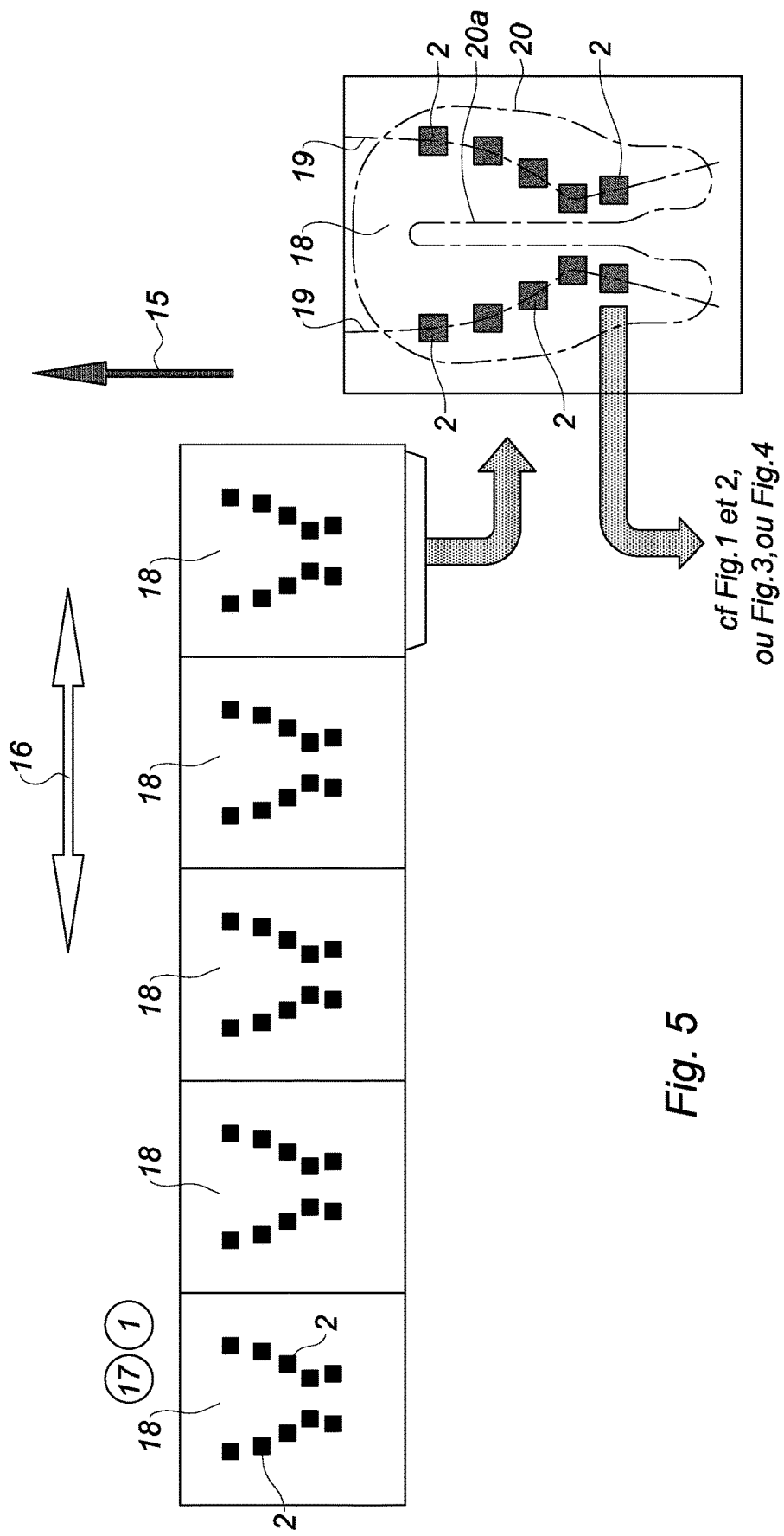
Figure 6:
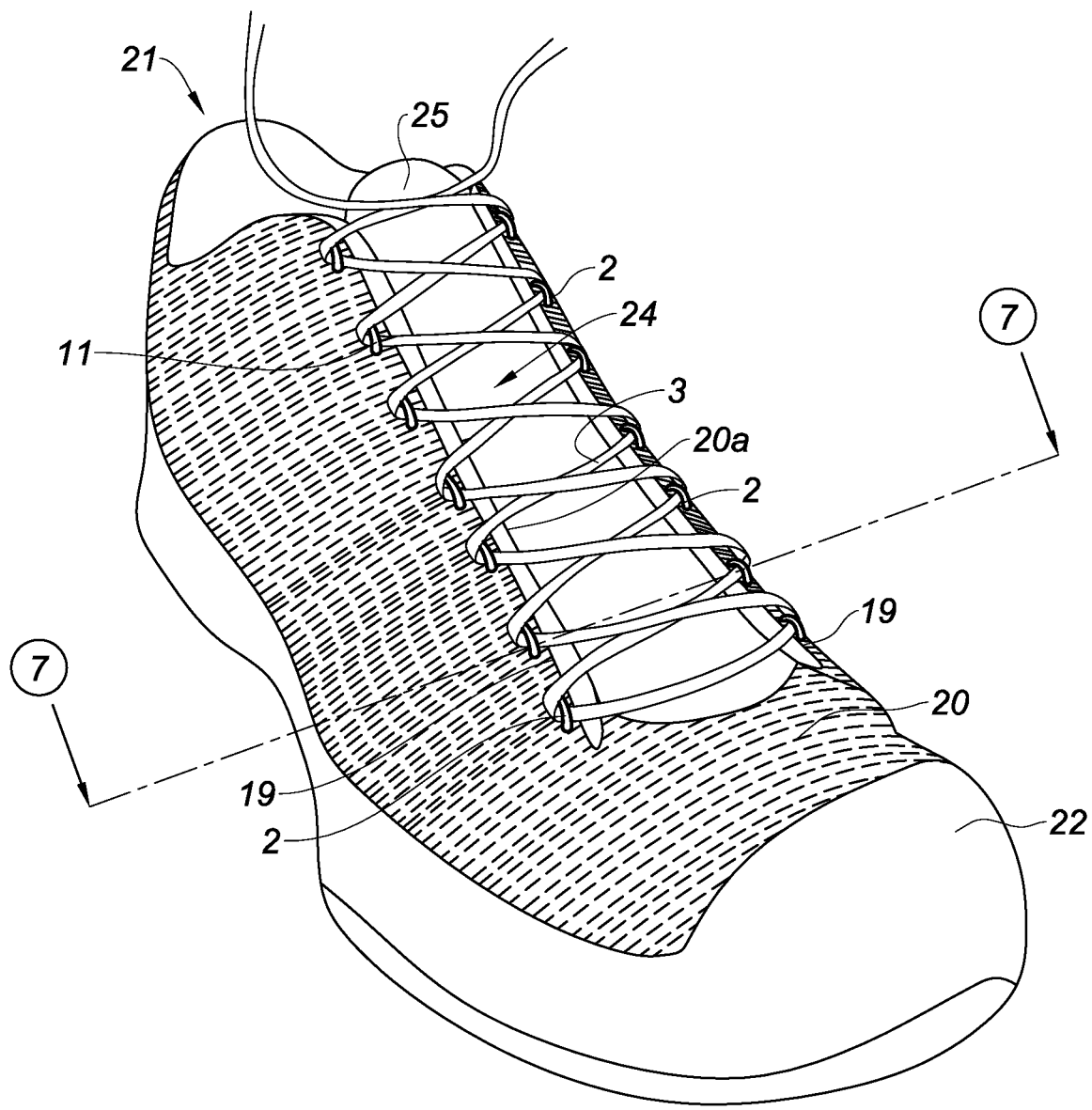
Figure 7:
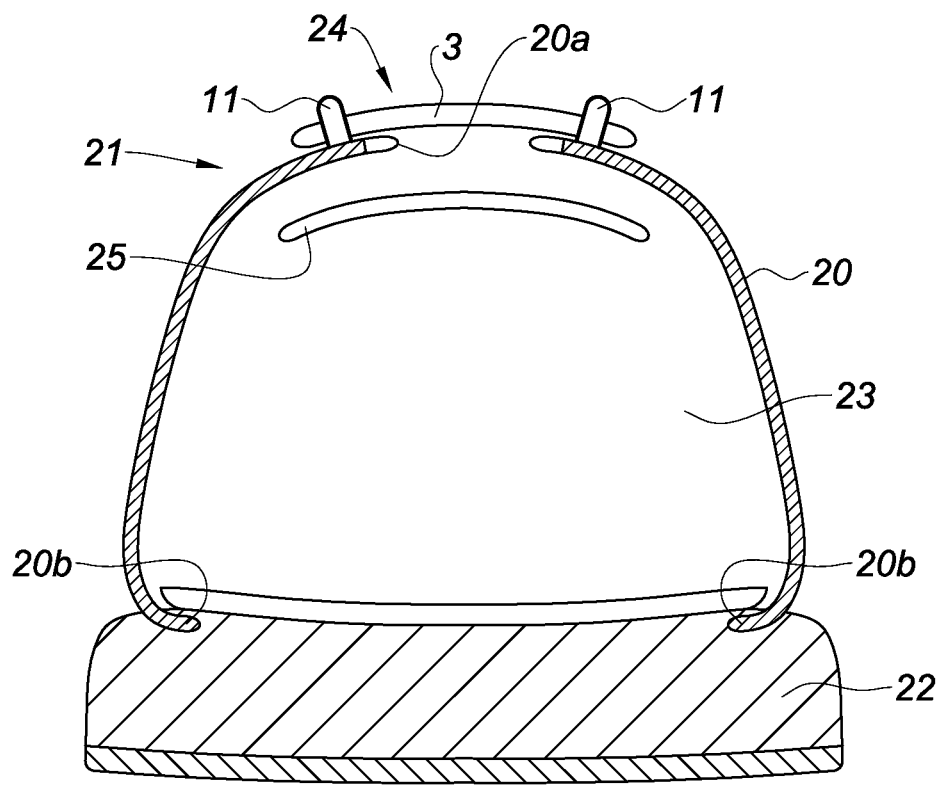
Figure 8:
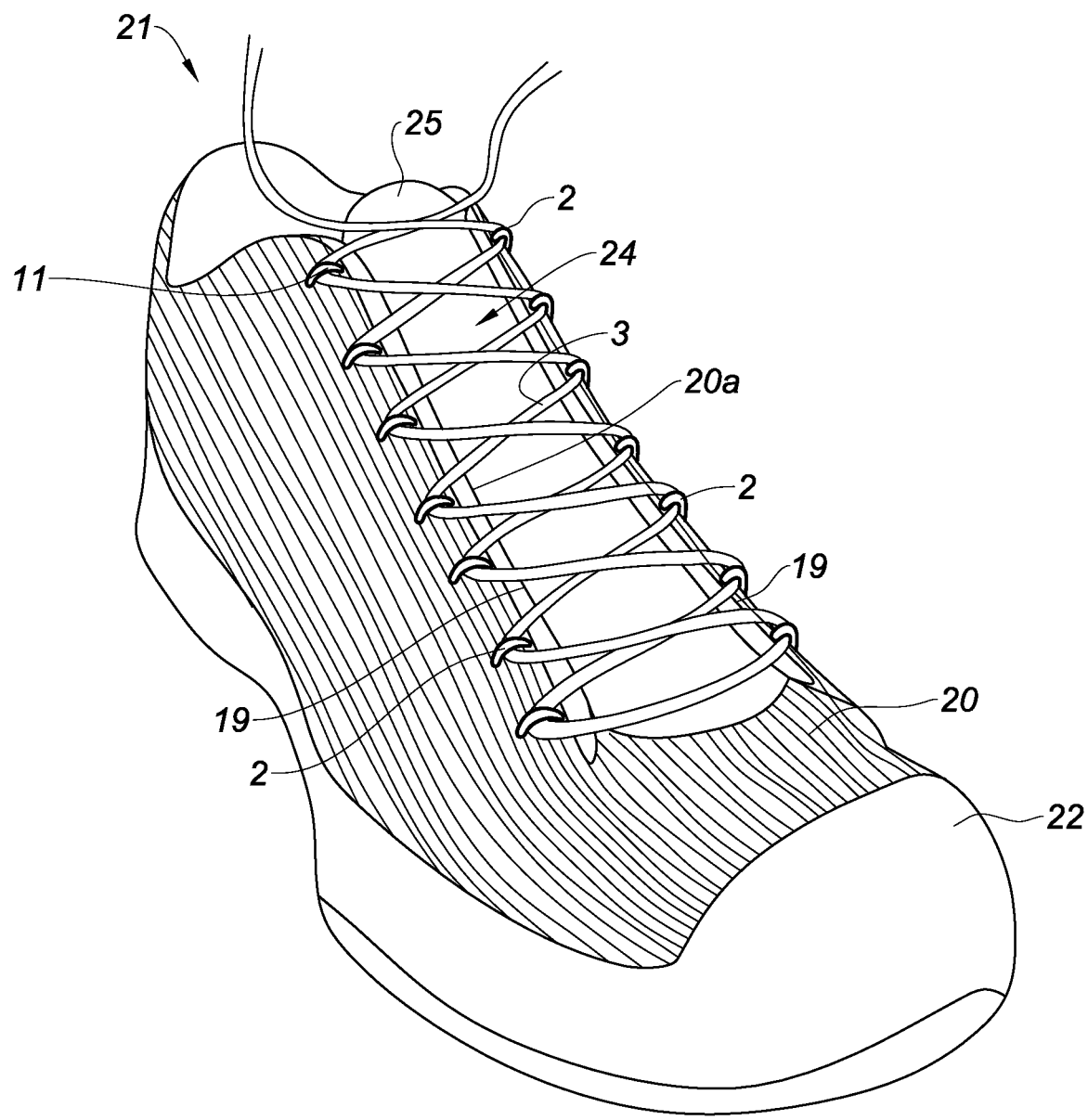

The present invention is now described for example purposes with reference to the appended drawings, in which:

FIG. 1 schematically represents a width of fabric according to the present invention, in top view seen from the outside, with a binding part represented schematically in top view and on an enlarged scale;

FIG. 2 again schematically represents the construction of the fabric according to FIG. 1, in cross-section in the warp direction of the fabric, passing in the middle of the binding part;

FIGS. 3 and 4 schematically represent two alternative embodiments of the binding part belonging to the fabric according to FIGS. 1 and 2;

FIG. 5 schematically represents a width of fabric according to the present invention comprising several templates from each of which a piece of fabric, such as a shoe upper, comprising two series of binding or lacing parts, can be obtained by cutting followed by shaping;

FIG. 6 schematically represents, in perspective view, a shoe comprising or integrating an upper obtained by the method schematised in FIG. 5, with a tie or lace joining the two parallel series of binding or lacing parts according to FIGS. 1 and 2 present on the shoe and directly integrated in the fabric of the upper;

FIG. 7 schematically represents a cross-sectional view along the cutting plane VII-VII, featured in FIG. 6, of the shoe represented in the latter;

FIG. 8 schematically represents a perspective view of an alternative embodiment of the shoe represented in FIGS. 6 and 7, with two parallel series of binding or lacing parts according to FIG. 3 present on the shoe and directly integrated in the fabric of the upper;

FIG. 9 again schematically represents the construction of the fabric according to FIG. 3, in cross-section in the weft direction of the fabric, passing in the middle of the binding part.

In FIGS. 1 to 5 and 9, the warp direction and weft direction are respectively referenced 15 and 16.

According to FIGS. 1 and 2, a fabric 1 according to the present invention comprises or integrates at least one binding part 2 with a tie 3, the latter passing freely through said part as represented in FIG. 2.

According to the invention, this binding part 2 is obtained at the place selected locally for binding of the fabric by the following textile construction:

a) the fabric comprises at least two superposed individual layers of fabric secured to one another with any predefined weave, defining multiple, regularly arranged or distributed attachment points 12, depending on the surface of the fabric.

Figure 9:
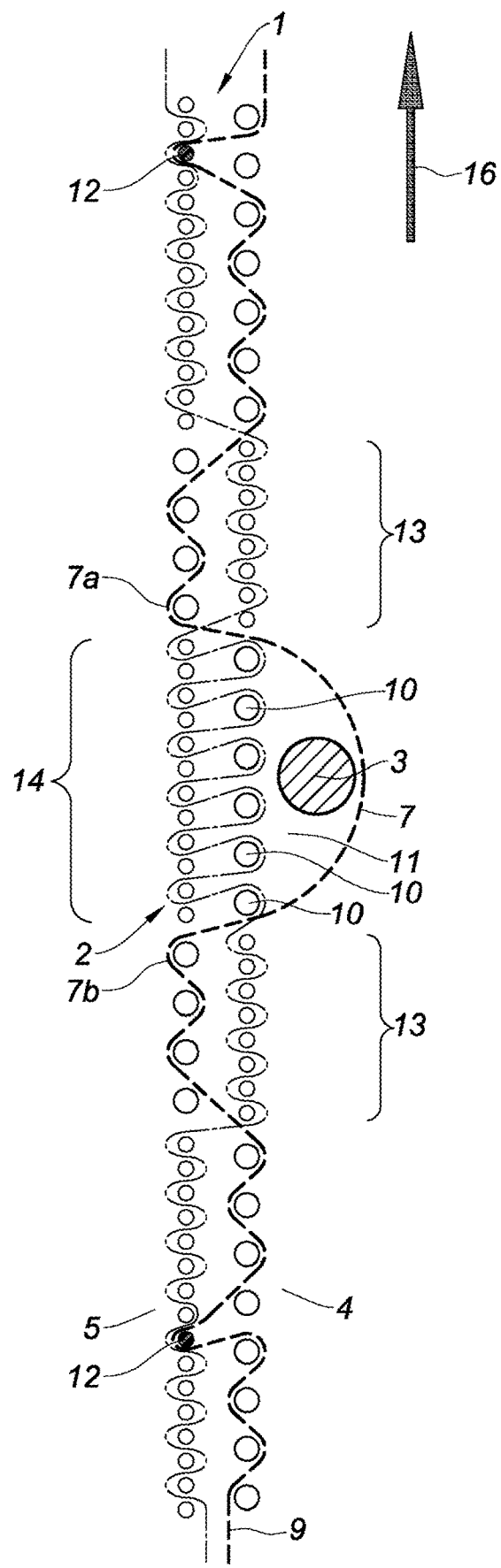

One of these layers is called outer layer 4 as it is situated on the side where the tie is located, whereas the other layer called inner layer 5 lines or supports the outer layer so that, as shown more specifically in FIGS. 2 and 9, the fabric presents an outer surface, shown in FIGS. 1, 3 and 4, i.e. that of outer layer 4, and an inner surface that is the outer surface of inner layer 5.

To simplify the representation of FIGS. 1 to 4 and 9, the weave of the fabrics forming outer layer 4 and inner layer 5 is a plain weave interweaving warp threads 10 and weft threads 8 in the case of outer layer 4; outer layer 4 and inner layer 5 can naturally have any other simple or complex weave.

b) Several warp threads 6 of outer layer 4 of fabric 1, called binding threads as they together form a binding loop 7, freely overlap or straddle several weft threads 8 of this same outer layer. These binding threads 6 predefine, i.e. before the fabric is worked or shaped, an eyelet 11 for passage of tie 3, with inner layer 5 of fabric, at the place or point where these binding threads overlap weft threads 8 of the same layer 4; eyelet 11 being obtained by deformation and/or extension of binding threads 6, and if applicable of outer layer 4, precisely at the place or point selected by construction on the fabric to secure the latter.

At the locations selected or defined on the fabric, to bind the latter in locally manner or point to point, i.e. here and there where the different binding parts 2 represented in the appended drawings are obtained in fabric 1, as defined and described in the foregoing, the present invention makes it possible to circumvent or reduce destructuring of fabric 1, caused by large and/or permanent or repeated stresses, for example tensile stresses, applied on tie 3 kept free in the binding parts, as is for example the case for lacing a shoe.

Each binding part 2, that is to say either itself and/or all or part of its periphery on fabric 1, can further be locally reinforced, i.e. on outer layer 4 of fabric, by raising of this outer layer and interweaving of several warp and/or weft threads of inner layer 5 of fabric, for example with a predefined weave, with weft threads 8 and/or warp threads 10 of outer layer 4 of fabric.

In this way, the mechanical strength of each binding part 2 can be further enhanced while at the same time preserving the aesthetics of the latter, at rest and under traction, due to the effect of the tie itself in tension or traction.

As shown in FIGS. 1 and 2, by raising certain warp threads of inner layer 5, under binding loop 7, these threads can be added and interweaved for example with any suitable weave, for example a 3/1 twill weave, with weft threads 8 left free underneath loop 7, on account of the free overlap of the latter by binding warp threads 6. An internal reinforcement 14 of eyelet 11 of each binding part 2 is thus obtained.

As shown only by FIG. 1, on one side or the other of eyelet 11, several warp and/or weft threads of inner layer 5 are raised and are added and interweaved with warp threads 10 and/or weft 8 threads of outer layer 4, for example with any suitable weave, for example a 3/1 twill weave. This weave is repeated in the overlap direction, i.e. warp direction 15, to obtain binding loop 7, by means of which a local reinforcement 30 of outer layer 4 of the fabric of suitable width (in weft direction 16) to increase the strength of binding part 2 is obtained on both sides of eyelet 11, for example in adjacent manner to or at a small distance from the latter.

As shown in FIGS. 1 and 2, on the side where each foot 7a or 7b of loop 7 is located, by raising certain warp and/or weft threads of inner layer 5, these threads can be added and interweaved in any suitable manner, of seam stitch type in embroidery, with weft threads 8 and/or warp threads 10 of outer layer 4 situated on each side of loop 7, outside the latter, for example adjacent to or at a small distance from loop 7. A local reinforcement 13 of outer layer 4 of fabric is thus obtained in at least one reinforcement direction perpendicular to the direction of free overlap of binding warp threads 6, i.e. in weft direction 16, over a distance in this direction at least equal to the pass-through width of binding loop 7 and therefore of eyelet 11. Each of the local reinforcements 13 is located on the same side as each foot 7a or 7b of loop 7, outside the latter, which also enables binding part 2 to be kept in position in outer layer 4 of fabric whatever the force and repetition of the mechanical stresses transmitted by tie 3 to the fabric.

As shown in particular by FIG. 2, the warp and/or weft threads of inner layer 5 have for example a smaller cross-section than that of warp threads 10 and/or weft threads 8 of outer layer 4, with the exception of reinforcement areas 13 of feet 7a and 7b of loop 7 in which at least the weft threads have a larger cross-section. Furthermore, again in these reinforcement areas 13, binding warp threads 6 of outer layer 4 descend for example towards inner layer 5 to secure layers 4 and 5 of fabric to one another.

As shown by FIGS. 1 and 2, outside binding parts 2, outer layer 4 and inner layer 5 of fabric are secured to one another at different securing points 12 distributed for example in regular manner with any suitable weave on the surface of the fabric.

Fabric 1 schematically represented in FIGS. 3 and 9 differs from that represented in FIGS. 1 and 2 in that each of binding parts 2 results from a different construction of the fabric in which several weft threads 9 of outer layer 4 of fabric, called binding threads as together they form a binding loop 7, freely overlap several warp threads 10 of the same layer. These binding weft threads 9 predefine an eyelet 11 for passage of tie 3, with inner layer 5 of fabric, at the place or point where overlap of warp threads 10 by binding weft threads 9 takes place. This eyelet 11 is obtained by deformation and/or extension of binding weft threads 9 at the place or point where binding of fabric 1 is performed.

Fabric 1 schematically represented in FIG. 4 differs from that represented in FIGS. 1 and 2 in that each of binding parts 2 results in a different construction of fabric 1 wherein, at the selected binding place or point on the fabric, several binding warp threads 6 of outer layer 4 of fabric freely overlap several weft threads 8 of the same layer, and several binding weft threads 9 freely overlap several warp threads 10 of the same layer. Binding warp threads 6 and binding weft threads 9 are interweaved with any suitable weave to together preform a woven binding loop 7.

In the industrial practice of the invention with any suitable double-warp weaving loom, preferably a Jacquard loom, suitably prepared by a single weaving operation, a width 17 or piece of fabric is obtained as previously defined and described and schematically represented in FIG. 5. This width 17 of fabric comprises a multiplicity of templates 18 distributed and/or repeated in warp direction 15 and/or weft direction 16. Each template 18 serves the purpose of obtaining one identical piece 20 by cutting and shaping of fabric 1, for example to obtain upper 20 of a shoe 21, presenting an indent 20a. Each template 18 comprises for example one or more binding lines 19, each binding line 19 being the fictitious line along which the different binding parts 2 are distributed or assembled at or on the surface of fabric 1, more precisely on the outer surface of outer layer 4 of the latter, to allow passage of a tie 3 through eyelets 11 of binding parts 2 respectively. For example, as represented in FIG. 5, each template comprises two binding lines 19 symmetrical with respect to a direction parallel to warp direction 15 or weft direction 16 of the fabric.

In order to distribute the forces generated by tensioning of tie 3 over the whole surface of the fabric, binding parts 2 integrated in fabric 1 are distributed in warp direction 15 and/or weft direction 16 of outer layer 4 of the fabric. For example, for this purpose binding parts 2 are offset from one another in warp direction 15 and/or weft direction 16.

With reference to FIGS. 6 and 7, an item of footwear 21, for example a sport shoes such as a shoe for pursuit of a racket sport (tennis for example), obtained from a fabric according to the present invention, is now described.

Footwear item 21 comprises a sole 22 made from a material of rubber type and an upper 20 made from fabric 1 according to the present invention, the bottom peripheral edge 20b of which is joined to sole 22 for example by sticking. As shown by template 18 in flat view on the right of FIG. 5, this upper 20 has the general shape of a horseshoe and extends symmetrically on each side of an indent 20a. Furthermore, as shown by FIG. 5, this upper 20 is obtained by cutting from a template 18 itself originally belonging to a piece or width of fabric 1 according to the invention. Once it has been cut and shaped or formed in volume, this upper 20 comprises two series of binding or lacing parts 2, or eyelets 11, respectively arranged along two substantially parallel binding lines on each side of indent 20a.

The different binding or lacing parts 2, or more precisely their respective eyelets 11, are used for through passage of a single tie 3 or lace, with any suitable lacing method in which tie 3 goes back and forth from one side of indent 20a to the other and straddles the latter, from the bottom part to the top part of said indent.

The useful inner volume 23 of footwear item 21 defined by upper 20 with sole 22 is determined to comfortably receive and secure the user's foot to the footwear.

Upper 20 comprises a means for closing 24 this useful inner volume firstly by a tongue 25 closing indent 20a, the tie being added on, for example stitched to the inside of upper 20, secondly by the two parallel series 19 of binding parts 2, or eyelets 11, facing one another on each side of indent 20a, and thirdly by tie 3, or lace, connecting the different binding parts 2, or eyelets 11, and straddling indent 20a. The prime function of this means for closing 24 is to enable the user's foot to be inserted in or removed from useful inner volume 23 of footwear 21 when tie 3 or lace is loosened. Depending on the degree of tightening of tie 3, the same means for closing 24 however also enables the shoe to be adjusted to fit the user's foot.

The footwear represented in FIG. 8 differs from that represented in FIGS. 6 and 7 by the fact that each of binding or lacing parts 2 is in accordance with the representation of FIG. 3 and the above description relating thereto.

The fabric integrating at least one binding part or binding parts 2 according to the invention is for example a technical fabric obtained according to or in compliance with the invention described in the document WO 2015 079,178, i.e. a multifunctional, monolithic or monoblock technical fabric as it comprises different individualised woven sectors presenting respectively different technical or practical properties/features from one sector to another. In such a case, depending on the finished article or product in which any flexible part obtained with the fabric is to be placed, one or more woven sectors of the same fabric integrate one or more binding parts 2 according to the invention distributed over the surface of the fabric so as for example to define one or more binding lines running through one or more woven sectors of the fabric for one or more ties with this fabric to respectively pass.

To conclude, the present invention also relates in general manner to a footwear item 21 comprising an upper 20 comprising a piece of fabric 1 demarcating an inner volume 23, means for closing 24 said inner volume formed by at least two series 19 of binding or lacing parts 2 on each side of an indent 20a of the upper, filled or not by a tongue 25, and a tie 3, or lace, connecting or passing through said binding parts 2, straddling said indent 20a, this footwear item being characterised in that several binding parts 2 are integrated or obtained directly by textile construction in fabric 1 of upper 20. For this purpose, for example, on the one hand fabric 1 comprises at least two superposed individual layers secured to one another, one layer being an outer layer 4 on the side where the tie is located and the other layer an inner layer 5 lining the outer layer, and on the other hand, at the location of a binding part 2, i.e. where binding part 2 is placed, several binding threads together forming a binding loop 7 belonging to the warp or to the weft of fabric 1 freely overlap several weft threads 8 or warp threads 10 of outer layer 4 of fabric 1. For example purposes, the binding threads, i.e. those of binding loop 7, are secured in inner layer 5 or in outer layer 4 of fabric 1 or are themselves binding threads of these two layers 4 and 5 of fabric 1.

In preferential manner, binding thread 6 or 9 of a binding part 2 is considered as belonging to outer layer 4 when it has more mechanical connections with outer layer 4 than with inner layer 5, advantageously at least twice as many mechanical connections with outer layer 4 than with inner layer 5, or even three or five times as many. For example purposes, FIG. 2 shows that warp thread 6 of outer layer 4 is connected to outer layer 4. This warp thread 6 comes into pinpoint contact with inner layer 5 to secure the two individual layers of fabric. As indicated in the foregoing, warp thread 6 of outer layer 4 can also be connected with inner layer 5 to reinforce inner layer 5 preferably when the feet of binding loop 7 are formed. A very large majority of the weft thread(s) and warp threads forming outer layer 4 or inner layer 5 are connected to one another in comparison with possible mechanical connections with the other layer, this for example representing at least 90% of the connections.

As illustrated in FIG. 2, when binding loop 7 is formed, binding thread 6 or 9 defines two feet formed by fixing of binding thread 6 or 9 with the weft or warp thread of outer layer 4 or inner layer 5. When free overlap of binding thread 6 or 9 takes place between the two feet, the binding thread is not mechanically connected to outer layer 4. It is possible to deform and/or stretch binding thread 6 or 9 to define the eyelet. When deformation and/or extension is performed, binding thread 6 or 9 moves away from the surface of outer layer 4. In more realistic manner, outer layer 5 and inner layer 4 also deform in opposite manner in order to define the eyelet.

It is also apparent that definition of the eyelet is advantageously partially performed by deformation of the outer layer to be able to insert tie 3. In other words, when the tie is not in the eyelet, the eyelet recloses i.e. binding loop 7 moves towards outer layer 4 in the free overlap area. This configuration is totally different from that presented in the document DE 1,277,765 that proposes formation of a loop formed by a considerably longer thread than its equivalent used in formation of a layer of fabric. This extra thread weakens the mechanical cohesion and makes the loop more easily liable to tear in the mechanical connection areas. This configuration is different from an architecture presented in the document U.S. Pat. No. 236,059 which provides for the shape of the cartridge belt to be preserved at all times.

Formation of the eyelet by deformation and/or extension of the binding threads means that a binding thread 6 or 9 can be obtained having substantially the same length between the two feet when the binding thread freely overlaps the outer layer in comparison with a binding thread continuously connected to the outer layer. This configuration facilitates manufacturing of the fabric as the warp or weft thread forming the binding thread is woven without greatly modifying the operation of the weaving loom. For example, the extra length of the binding thread is advantageously less than 20% and preferably less than 10% in comparison with the same thread defining outer layer 4 between two feet separated by the same distance.

In a preferential embodiment, binding loop 7 is formed on the one hand by binding thread 6 or 9 which can be a warp thread or a weft thread, and on the other hand by the other thread forming the outer layer. In other words, the weft threads and warp threads forming the outer layer separate to form the two opposite edges of the binding loop as illustrated in FIG. 2. In the embodiment illustrated in FIG. 2, binding loop 7 can be formed by a single type of thread, i.e. the binding thread salient from outer layer 4. The other portion of binding loop 7 formed by outer layer 4 can be formed by a single type of thread or possibly by raising of a thread of inner layer 5.

In the embodiment illustrated in FIG. 2, the repetition pitch of the weft threads of inner layer 5 is smaller than the repetition pitch of the weft threads of outer layer 4, for example twice as small. The same can be the case for the warp threads. It is then advantageous to use weft threads and/or warp threads having different diameters. The inner layer presents a denser weave than that of the outer layer so that the inner layer has a greater strength than that of the outer layer. The strength at the level of the eyelet is improved on account of the increased strength provided by the inner layer. As indicated in the above, it is advantageous to have a denser weave in immediate proximity to the binding loop to enhance the strength of the eyelet.

The invention claimed is:

1. A footwear comprising:
   an upper comprising a flexible fabric, the flexible fabric comprising:
   an outer fabric layer;
   an inner fabric layer superposed and secured to the outer fabric layer by attachment points to line the outer fabric layer;
   at least one binding part defining at least one binding loop forming at least one eyelet for passage of a tie, the at least one binding part comprising several binding threads defining the at least one binding loop, each binding loop comprising two feet fixing the binding loop, the at least one binding part not being a woven fabric between the two feet;
   wherein the flexible fabric defines an indent and the at least one binding part comprises a first set of binding parts and a second set of binding parts defining respectively a first series of eyelets and a second series of eyelets, the first set and the second set of binding parts being separated by the indent; and
   wherein when the binding threads are warp threads, the two feet are separated by a plurality of weft threads of the outer fabric layer and the binding threads freely overlap several weft threads of the outer fabric layer so as to define the binding loop; and
   wherein when the binding threads are weft threads, the two feet are separated by a plurality of warp threads of the outer fabric layer and the binding threads freely overlap several warp threads of the outer fabric layer so as to define the binding loop; and
   a lace passing through said first and second series of eyelets and straddling the indent, the lace and the first and second series of eyelets closing an inner volume of the footwear upper.

2. The footwear according to claim 1, wherein the footwear is a sport footwear.

3. The footwear according to claim 1, wherein the binding threads are warp threads of the outer fabric layer, wherein the inner fabric layer comprises inner warp threads and inner weft threads and wherein some of the inner warp threads or some of the inner weft threads are interwoven with warp threads of the outer fabric layer or weft threads of the outer fabric layer so as to form two local reinforcement areas, the two local reinforcement areas being separated by the at least one binding part along the weft direction.

4. The footwear according to claim 1, wherein the binding threads are weft threads of the outer fabric layer, wherein the inner fabric layer comprises inner warp threads and inner weft threads and wherein some of the inner warp threads or some of the inner weft threads are interwoven with warp threads of the outer fabric layer or weft threads of the outer fabric layer so as to form two local reinforcement areas, the two local reinforcement areas being separated by the at least one binding part along the warp direction.

5. The footwear according to claim 1, wherein the binding threads are warp threads of the outer fabric layer, wherein the inner fabric layer comprises inner warp threads and inner weft threads and wherein some of the inner warp threads or some of the inner weft threads are interwoven with warp threads of the outer fabric layer or weft threads of the outer fabric layer so as to form two local reinforcement areas, the two local reinforcement areas being separated by the at least one binding part along the warp direction.

6. The footwear according to claim 1, wherein the binding threads are weft threads of the outer fabric layer, wherein the inner fabric layer comprises inner warp threads and inner weft threads and wherein some of the inner warp threads or some of the inner weft threads are interwoven with warp threads of the outer fabric layer or weft threads of the outer fabric layer so as to form two local reinforcement areas, the two local reinforcement areas being separated by the at least one binding part along the weft direction.

7. The footwear according to claim 1, wherein the outer fabric layer is a layer having a first side in contact with the inner fabric layer and a second opposite side not covered by a fabric layer, the at least one binding part protruding from the second opposite side.

8. The footwear according to claim 1, wherein the outer fabric layer is a single ply fabric layer and wherein the at least one binding loop is delineated on one hand by the binding threads and on the other hand by threads of the outer fabric layer, one of the binding threads and the threads of the outer fabric layer being warp threads and another of the binding threads and the threads of the outer fabric layer being weft threads.

9. The footwear according to claim 1, wherein each of the binding threads has a length between the respective two feet that is larger than a distance between the two feet with an extra length less than 20%.

10. The footwear according to claim 1, wherein each of the binding threads has a length between the respective two feet that is larger than a distance between the two feet with an extra length less than 10%.

11. The footwear according to claim 1, wherein the lace deforms elastically the binding threads.

12. The footwear according to claim 11, wherein the lace deforms the outer fabric layer and the inner fabric layer.

* * * * *